(12) United States Patent
Thomas et al.

(10) Patent No.: US 6,430,510 B1
(45) Date of Patent: Aug. 6, 2002

(54) APPLICATION OF HYBRID GATHERS FOR RAPID DETERMINATION OF SEISMIC ACQUISITION PARAMETERS

(75) Inventors: James W. Thomas; Gary M. Hoover, both of Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 133 days.

(21) Appl. No.: 09/708,368

(22) Filed: Nov. 8, 2000

(51) Int. Cl.[7] .................................................. G01V 1/28
(52) U.S. Cl. ........................................................ 702/14
(58) Field of Search ............................... 702/14, 18, 16; 367/73

(56) References Cited

U.S. PATENT DOCUMENTS

| | | | |
|---|---|---|---|
| 4,677,598 A | 6/1987 | Johnson | 367/56 |
| 5,598,378 A | 1/1997 | Flentge | 367/56 |
| 5,787,051 A | 7/1998 | Goodway et al. | 367/56 |
| 6,026,058 A | 2/2000 | Thomas | 367/56 |

*Primary Examiner*—Donald E. McElheny, Jr.
(74) *Attorney, Agent, or Firm*—Ryan N. Cross

(57) ABSTRACT

In accordance with the present invention, a method is disclosed herein which is primarily designed for use in improving the seismic data collection process through the use of hybrid gathers. The instant invention is suitable for application either in the field during seismic acquisition as part of the process or back at the main processing center, although it will probably be of greatest use in the field. That being said, the computational efficiency of the instant method and its ability to work effectively with low fold seismic data sets argue that it would be most useful in the field. By timely application of the instant method it is possible to improve or optimize the selection of acquisition parameters such as geophone spacing, line layouts, shot locations, instrument filters, etc., while the data are being acquired.

20 Claims, 5 Drawing Sheets

APPLICATION OF HYBRID GATHERS FOR RAPID DETERMINATION OF SEISMIC ACQUISITION PARAMETERS

TECHNICAL FIELD

This invention relates to the general subject of seismic exploration and, in particular, to seismic data acquisition and to methods for improving the quality of the data collected during seismic surveys.

BACKGROUND OF THE INVENTION

The broad goal of a seismic survey is to image or map the subsurface of the earth by sending energy down into the ground and recording the "echoes" that return from the rock layers below. The source of the down-going sound energy might come, for example, from explosions or seismic vibrators on land, or air guns in marine environments. During a seismic survey, the energy source is systematically positioned at locations near the surface of the earth above a geologic structure of interest. Each time the source is activated, it generates a seismic signal that travels downward through the earth, is partially reflected, and, upon its return, is recorded at a great many locations on the surface. The seismic signals are partially reflected from discontinuities of various types in the subsurface (including reflections from "rock layer" boundaries) and the reflected energy is transmitted back to the surface of the earth where it is recorded as a function of travel time. The sensors that are used to detect the returning seismic energy are usually geophones (land surveys) or hydrophones (marine surveys). The recorded returning signals, which are at least initially continuous electrical analog signals which represent amplitude versus time, are generally quantized and recorded as a function of time using digital electronic so that each data sample point may be operated on individually thereafter.

Multiple source activation/recording combinations are subsequently combined to create a near continuous profile of the subsurface that can extend for many miles. In a two-dimensional (2D) seismic survey, the recording locations are generally laid out along a single line, whereas in a three dimensional (3D) survey the recording locations are distributed across the surface in a grid pattern. In simplest terms, a 2D seismic line can be thought of as giving a cross sectional picture (vertical slice) of the earth layers as they exist directly beneath the recording locations. A 3D survey produces a data "cube" or volume that is, at least conceptually, a 3D picture of the subsurface that lies beneath the survey area. In reality, though, both 2D and 3D surveys interrogate some volume of earth lying beneath the area covered by the survey.

A seismic survey is composed of a very large number of individual seismic recordings or traces. In a typical 2D survey, there will usually be several tens of thousands of traces, whereas in a 3D survey the number of individual traces may run into the multiple millions of traces. Chapter 1, pages 9–89, of *Seismic Data Processing* by Ozdogan Yilmaz, Society of Exploration Geophysicists, 1987, contains general information relating to conventional 2D processing and that disclosure is incorporated herein by reference. General background information pertaining to 3D data acquisition and processing may be found in Chapter 6, pages 384–427, of Yilmaz, the disclosure of which is also incorporated herein by reference. Additionally, U.S. Letters Pat. No. 6,026,058 contains information pertinent to 3D surveys and the use of the hybrid gather technology discussed hereinafter, and that reference is also specifically incorporated herein by reference.

A modern seismic trace is a digital recording (analog recordings were used in the past) of the acoustic energy that has been reflected from inhomogeneities or discontinuities in the subsurface, a partial reflection occurring each time there is a change in the elastic properties of the subsurface materials. The digital samples that make up the recording are usually acquired at 0.002 second (2 millisecond or "ms") intervals, although 4 millisecond and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface. Many variations of the conventional source-receiver arrangement are used in practice, e.g. VSP (vertical seismic profiles) surveys. Further, the surface location of every trace in a seismic survey is carefully tracked and is generally made a part of the trace itself (as part of the trace header information). This allows the seismic information contained within the traces to be later correlated with specific surface and subsurface locations, thereby providing a means for posting and contouring seismic data— and attributes extracted therefrom—on a map (i.e., "mapping").

The data in a 3D survey are amenable to viewing in a number of different ways. First, horizontal "constant time slices" may be extracted from a stacked or unstacked seismic volume by collecting all of the digital samples that occur at the same travel time. This operation results in a horizontal 2D plane of seismic data. By animating a series of 2D planes it is possible for the interpreter to pan through the volume, giving the impression that successive layers are being stripped away so that the information that lies underneath may be observed. Similarly, a vertical plane of seismic data may be taken at an arbitrary azimuth through the 3D volume by collecting and displaying the seismic traces that lie along the path of selected azimuth. This operation, in effect, extracts an individual 2D seismic line from within the 3D data volume.

Seismic data that have been properly acquired and processed can provide a wealth of information to the explorationist, who is one of the individuals within an oil company whose job it is to identify potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of the seismic survey data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets.

Of course, the reliability of the analysis is ultimately dependent on obtaining high quality seismic information at the start of the process, i.e., in the field when the data are acquired. Those skilled in the art will recognize that the quality of a seismic survey is dependent on certain parametric design choices that are made prior to (and sometimes during) the collection of the data. For example, survey acquisition parameters such as maximum and minimum source-receiver offset, geophone array length, in-line and cross-line receiver spacing, seismic source (i.e., "shot") spacing, source properties (e.g., charge size, sweep frequency, air gun volume, etc.) are all examples of well known explorationist-controlled parameters whose choice can have a significant impact on the quality of the final product. These sorts of survey parameters are generally referred to as "acquisition parameters" or "field parameters" by those skilled in the art.

The initial phase of survey design typically takes place in the office of the explorationist, who might use techniques such as seismic modeling to test the proposed acquisition parameters against the expected subsurface geology to determine whether the data collected during the survey will yield acceptable coverage over the region of exploration or exploitation interest. Additionally, there are analytic tools that can provide some guidance in the selection of certain of the parameters (e.g., general array theory can be used to help select geophone spacing). Further, there are a host of well-known "rules-of-thumb" that are available to help guide the explorationist in his or her parameter selection (As a specific example, consider the well known "rule" that the longest source-receiver offset should usually be at least as long as the depth to the deepest target of interest.)

That being said, no matter how carefully the survey is planned, it is almost always necessary to finalize selection of at least some of the acquisition parameters (and modify the pre-survey choices of others) in the field after the survey crew reaches the site. Thus, and as is well known to those skilled in the art, it is common practice to conduct pre-survey tests that are designed to validate in the field the various field parameter choices in advance of conducting the full survey. These tests usually involve collecting a series of seismic recordings (e.g., shot records), wherein each recording might reflect one or more different parameter value settings. By comparing the records so obtained, decisions are made regarding the best possible parameter selections for this survey. Depending on the type of survey, the field crew might run, by way of example, noise tests, sweep tests, ground roll tests, etc. The ultimate goal, of course, is to find the combination of parameter settings that yields the best image of the target reflector(s).

However, in general it can be quite challenging to evaluate the imaging quality of raw seismic data in the field, because unprocessed data may be so dominated by noise that even prominent reflectors are difficult to identify. This is for any number of reasons, but one of the most important is that the field data are very low fold and lack much in the way of signal enhancement. In a typical scenario, plots of "field records" are used to compare the different test shots, each field record being a collection individual traces from a single shot/parameter experiment. (Note that the term "shot" will be used hereinafter to refer to the activation of any sort of seismic source, whether that source is dynamite, vibrator, air gun, etc.) On the other hand, composite or "stacked" seismic traces are traditionally used for geophysical interpretation because of their superior signal content. Thus, critical survey design decisions will necessarily be based on data that is recognizably less than desirable.

Of course, the application of certain sophisticated computer algorithms to the traces in the shot records might provide some level of noise attenuation but, generally speaking, that is not a realistic possibility in the field. Except possibly for some of the more simple single-trace seismic processes (e.g., band pass filters, gain adjustments, etc.), signal conditioning in the field is not an option because most field crews do not have the computer power that would be necessary to handle the more computationally intensive seismic processes. Additionally, even if the computer power were available, conventional processing options would not generally be of much help because the seismic coverage is such low fold. Thus, many of the noise-reducing processes (such as stacking) that might otherwise be helpful with these traces cannot be applied.

Heretofore, as is well known in the seismic processing and seismic interpretation arts, there has been a need for a method of improving the in-field quality of seismic data which does not require enormous amount of computing power and which is designed to work with the low-fold data that are typically obtained during pre-survey noise-type tests. Accordingly, it should now be recognized, as was recognized by the present inventor, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

In accordance with the present invention, a method is disclosed hereinafter which is primarily designed for use in improving the seismic data collection process. The instant invention is suitable for application either in the field during seismic acquisition as part of the process or back at the main processing center, although it will probably be of greatest use in the field. That being said, the computational efficiency of the instant method and its ability to work effectively with low fold seismic data sets argue that it would be most useful in the field. By timely application of the instant method it is possible to improve or optimize the selection of acquisition parameters such as geophone spacing, line layouts, shot locations, instrument filters, etc., while the data are being acquired.

According to a first aspect of the instant invention, there is provided an improved method of seismic acquisition which begins by acquiring seismic data that includes a plurality of single fold traces distributed in a semi-regular pattern over the surface of the earth. In the preferred embodiment, these traces will be in the form of a hybrid gather. One feature of the hybrid gather that makes it particularly useful for purposes of the instant invention is that it provides regularly distributed single-fold coverage over a region of the subsurface.

Given one or more hybrid gathers, a next preferred step is to process those gathers to improve their image quality. In the preferred embodiment, this processing will take place in the field. However, rather than using conventional and well known single-trace processing algorithms, because of the way that the data have been collected it is possible to apply any multi-trace seismic process that would be suitable for use on a stacked seismic volume. The reason for this is quite clear: the hybrid gather is essentially a single-fold seismic survey over a particular region of the subsurface. Thus, it is amenable to processing by post-stack methods that would otherwise not be appropriate for use with field data. Processes that would be suitable for use at this step include, for example, 3D FXY deconvolution, 3D migration, 3D DMO, etc., each of which algorithms is well known to those of ordinary skill in the seismic processing arts. In short, any seismic process that would be suitable for use with a stacked data volume may be used to improve the quality of the collected seismic traces.

After viewing the processed hybrid gather, the field crew will be in a better position to decide how (if at all) the acquisition parameters should be changed in order to improve the quality of the collected seismic data. In more particular, by comparing the seismic reflections from the processed hybrid gather with those that are expected for the survey region (e.g., from data collected during previous surveys or from synthetic seismic models) it is possible to evaluate the effectiveness of the current parameter settings and determine whether adequate images of the reflector(s) of interest are being obtained. Then, if the observed data are not yielding satisfactory images, adjustments can be made at the beginning of the survey before the bulk of the data are collected.

The importance of this result is that heretofore there has been no easy method of rapidly bringing to bear the power of multi-trace post-stack processing in the field because of the generally limited computational capacity (including the ability to sort and stack large data volumes) available during a seismic survey.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

DETAILED DESCRIPTION

Figure 1:
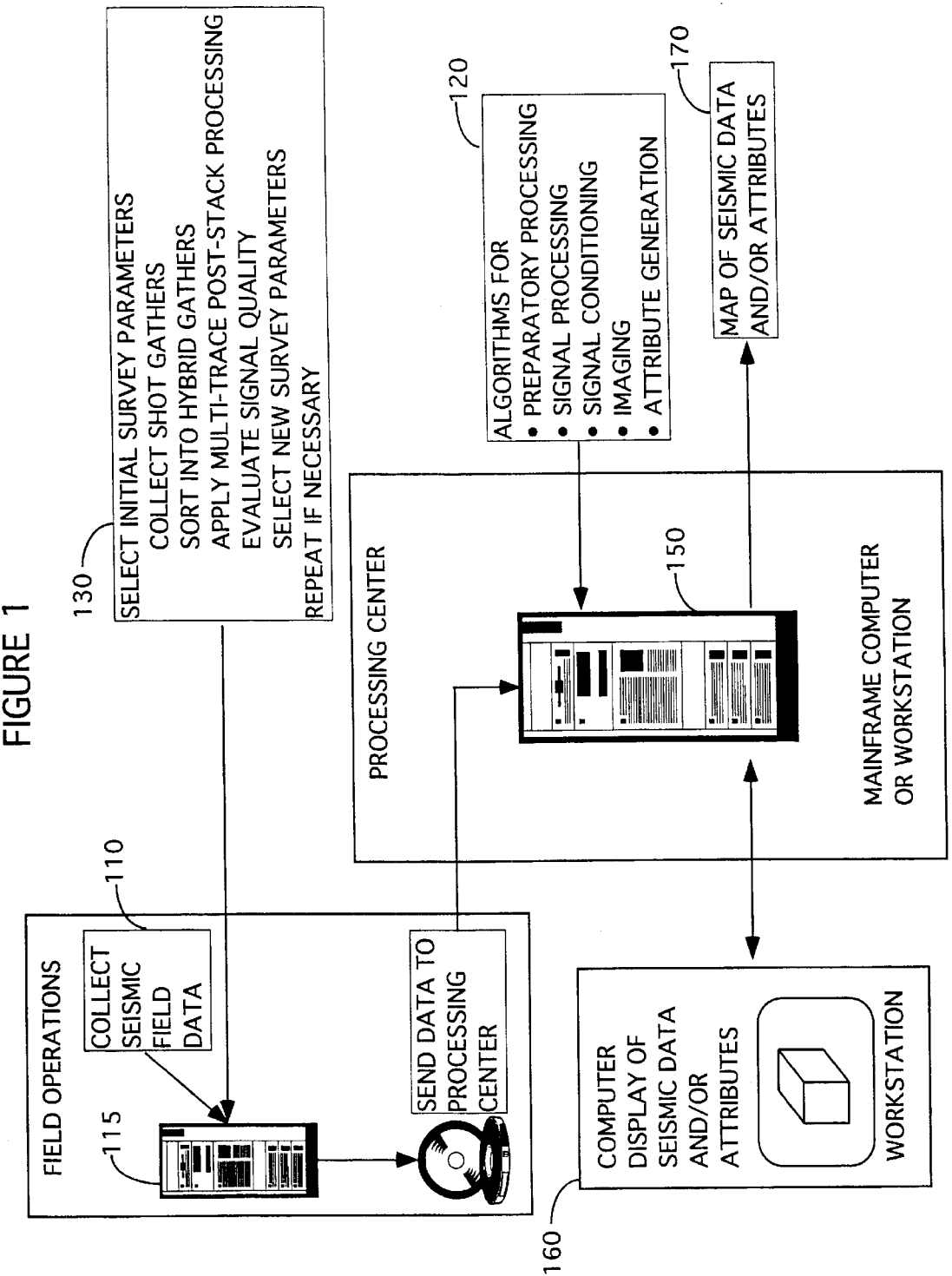
FIG. 1 illustrates generally the environment in which the invention disclosed herein would typically be used.

While this invention is susceptible of embodiment in many different forms, there is shown in the drawings, and will be described hereinafter in detail, some specific embodiments of the instant invention. It should be understood, however, that the present disclosure is to be considered an exemplification of the principles of the invention and is not intended to limit the invention to the specific embodiments or algorithms so described.

ENVIRONMENT OF THE INVENTION

FIG. 1 illustrates the general environment in which the instant invention would typically be used. In the conventional arrangement, seismic data 110 are collected in the field over a subsurface target of potential economic importance. The data might be collected over land, water, or any combination of these environments. In any case, it is always an object to collect the highest quality raw data (i.e., unprocessed seismic trace data) as is possible, as that can only make the subsequent job of processing and interpretation easier. Methods and procedures for acquiring seismic data in the field are well known to those of ordinary skill in the art. See, for example, *Applied Geophysics*, chapter 4.5, by Telford, Geldart, Sheriff, and Keys, 1978, Cambridge University Press, N.Y., and chapter 3 of *Seismic Exploration Fundamentals*, by J. A. Coffeen, 1978, Penwell Press, Tulsa, Okla., the disclosures of both of which are incorporated herein by reference.

The instant invention would most typically be applied at the start of the data acquisition process, as this would be the time when field acquisition parameters are usually chosen and refined. As the seismic data are collected, it is customary to record the traces on magnetic media, which media might include tape or disk. Although the seismic traces are available for immediate review in the field as they are collected, usually only superficial attention is given to the individual records because of the large number of recordings (and associated number of seismic traces) that are taken each day. Thus, acquisition parameter settings are typically not reviewed in any great detail as the survey progresses.

After the seismic data have been collected, the traces are typically sent from the field to a processing center where a variety of preparatory processes 120 are applied to the seismic traces to make them ready for subsequent processing and interpretation. The processed traces would then be stored, by way of example only, on hard disk, magnetic tape, magneto-optical disk, DVD disk, or other mass storage means.

The methods disclosed herein would best be implemented in the form of a computer program 130 that has been loaded onto a general purpose programmable computer 150 where it is accessible in the field by the seismic crew. A general purpose computer 150 includes, in addition to mainframes, workstations and personal computers, computers that provide for parallel and massively parallel computations, wherein the computational load is distributed between two or more processors. During field operations, typically only a personal computer or workstation would be available to practice the methods of the instant invention, although more powerful computers might be available for use via network connections (including, for example, telecommunication and satellite links).

A program 130 embodying the instant invention might be conveyed into the computer that is to execute it by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network.

Figure 2:
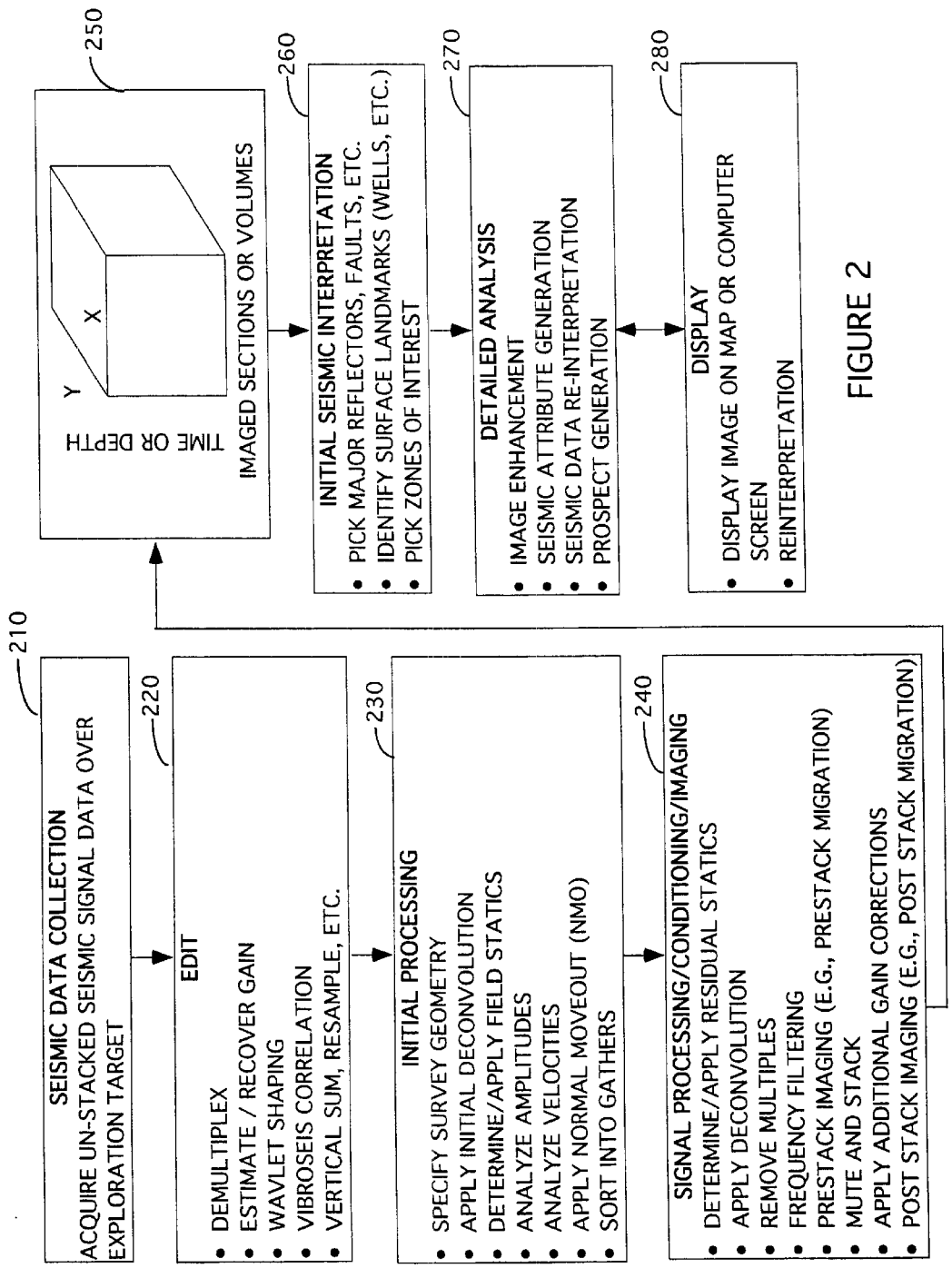
FIG. 2 illustrates some steps in a typical seismic processing sequence.

In a typical seismic processing environment, the steps listed in FIG. 2 will usually be performed by software algorithms that have been made part of a large package of modules that is designed to process seismic data from demultiplex through final stack and migration. The processed stacked seismic traces will typically be sorted into gathers, stacked, (step 240) and displayed either at a high resolution color computer monitor 160 (FIG. 1) or in hardcopy form as a printed seismic section or a map 170. The seismic interpreter uses the displayed images to assist him or her in identifying subsurface features conducive to the generation, migration, or accumulation of hydrocarbons.

Seismic Processing

The data that are collected in the field consist of unstacked (i.e., unsummed) seismic traces which contain digital information representative of the volume of the earth lying beneath the survey. Raw field data are not in a form that is most useful for exploration purposes and it is customary to subject the field traces to various processing algorithms of the general sort listed in FIG. 2 (steps 210 through 250) in preparation for its use by the explorationist (steps 260 through 280). Those skilled in the art will recognize that the processing steps illustrated in FIG. 2 are only broadly representative of the sorts of steps that seismic data would normally go through before it is interpreted: the choice and order of the processing steps, and the particular algorithms invoked, may vary markedly depending on the particular seismic processor, the signal source (dynamite, vibrator, etc.), the survey location (land, sea, etc.) of the data, and the company that processes the data.

As is generally illustrated in FIG. 2, preparing seismic data for use in interpretation is a complex process that involves a great many specialized algorithmic steps. What is not apparent in this figure is the computational power that is required to move thousands (or hundreds of thousands or even millions) of seismic traces through this sequence of steps. Those skilled in the art will recognize that this level of processing power is generally not available in the field during acquisition.

Common early processing steps include basic trace editing 220 and specification of the geometry of the survey (step 230). As part of this step, each seismic trace is associated with both the physical receiver (or array) on the surface of the earth that recorded that particular trace and the shot (or generated seismic signal) that was recorded. The positional information pertaining to both the shot and receiver surface positions is then made a permanent part of the seismic trace "header," a general purpose storage area that accompanies each seismic trace. This shot-receiver location information is later used to determine the position of the "stacked" seismic traces. An NMO correction adjusts the samples in each seismic trace according to their distance from that shot so that energy returning from the same reflectors are aligned at the same time on the seismic trace. This process is well known to those skilled in the art and will not be discussed further herein, although additional details are available in Yilmaz, cited previously, at pages 154–166, the disclosure of which is incorporated herein by reference.

After the initial pre-stack processing is completed, it is customary to condition the seismic signal on the unstacked seismic traces before creating stacked (or summed) data volumes (step 240). In FIG. 2, the "Signal Processing/Conditioning/Imaging" step 240 suggests a typical processing sequence, although those skilled in the art will recognize that many alternative processes could be used in place of the ones listed in the figure. In any case, the ultimate goal from the standpoint of the explorationist is the production of a stacked (and preferably migrated) seismic volume—or, in the case of 2D data, a stacked seismic line—for use in the exploration for hydrocarbons within the subsurface of the earth. Those skilled in the art will know that seismic data is conventionally "stacked" by first sorting it into "CMP" (i.e., common mid-point) or "CDP" (comon depth point) gathers and then, for each such gather, summing together all of the digital seismic values at the same "time" level, thereby producing a single average or composite trace from the seismic traces in the gather. Note that the process of organizing the unstacked 3D traces into gathers is referred to as "binning", a term that is well known in the art.

As is suggested in FIG. 2, any digital sample within a stacked seismic volume is uniquely identified by an (X, Y, TIME) triplet: the X and Y coordinates representing some position on the surface of the earth, and the time coordinate measuring a recorded arrival time within the seismic trace (step 250). For purposes of specificity, it will be assumed that the X direction corresponds to the "in-line" direction, and the Y measurement corresponds to the "cross-line" direction, as the terms "in-line" and "cross-line" are generally understood to mean in the art. Although time is the preferred and most common vertical axis unit, those skilled in the art understand that other units are certainly possible might include, for example, depth or frequency. Additionally, it is well known to those skilled in the art that it is possible to convert seismic traces from one axis unit (e.g., time) to another (e.g., depth) using standard mathematical conversion techniques. That being said, the discussion that follows will be framed largely in terms of "time" as a vertical axis measure, but that choice was made for purposes of specificity only, rather than out of any intention to so limit the methods disclosed herein. Thus, when "time" is described hereinafter as a vertical axis of a seismic trace, that term should be broadly construed to also include any other applicable vertical axis, including depth or frequency.

Another important use for seismic data is as a source for seismic attributes (step 270). As is well known to those skilled in the art, seismic attributes are values that are calculated from seismic data and that serve to highlight some specific property or feature of the data that might not otherwise be apparent. Although FIG. 2 seems to indicate that seismic attribute generation 270 takes place relatively late in the processing sequence, that is not always the case and attributes might potentially be calculated and analyzed at almost any stage of the processing.

The explorationist may do an initial interpretation 260 of the resulting processed data (which will typically be a migrated seismic volume), wherein he or she locates and identifies the principal reflectors and faults wherever they occur in the data set. Finally, as noted in FIG. 2, the explorationist will use the processed seismic data to locate subsurface structural or stratigraphic features conducive to the generation, accumulation, or migration of hydrocarbons (i.e., prospect generation 270). This effort may incorporate additional data from a variety of non-seismic sources including, for example, well logs, satellite surveys, magnetic surveys, gravity surveys, etc. The results of this analysis may convince the explorationist that the initial interpretation was flawed (or inconsistent with the new information) and, in which case, a new interpretation may be formed. Needless to say, the process of interpretation/reformulation may be repeated as necessary until the interpreter has fully integrated data from all sources and is ready to move to the prospect generation 270 stage.

Forming the Hybrid Gather

Figure 4:
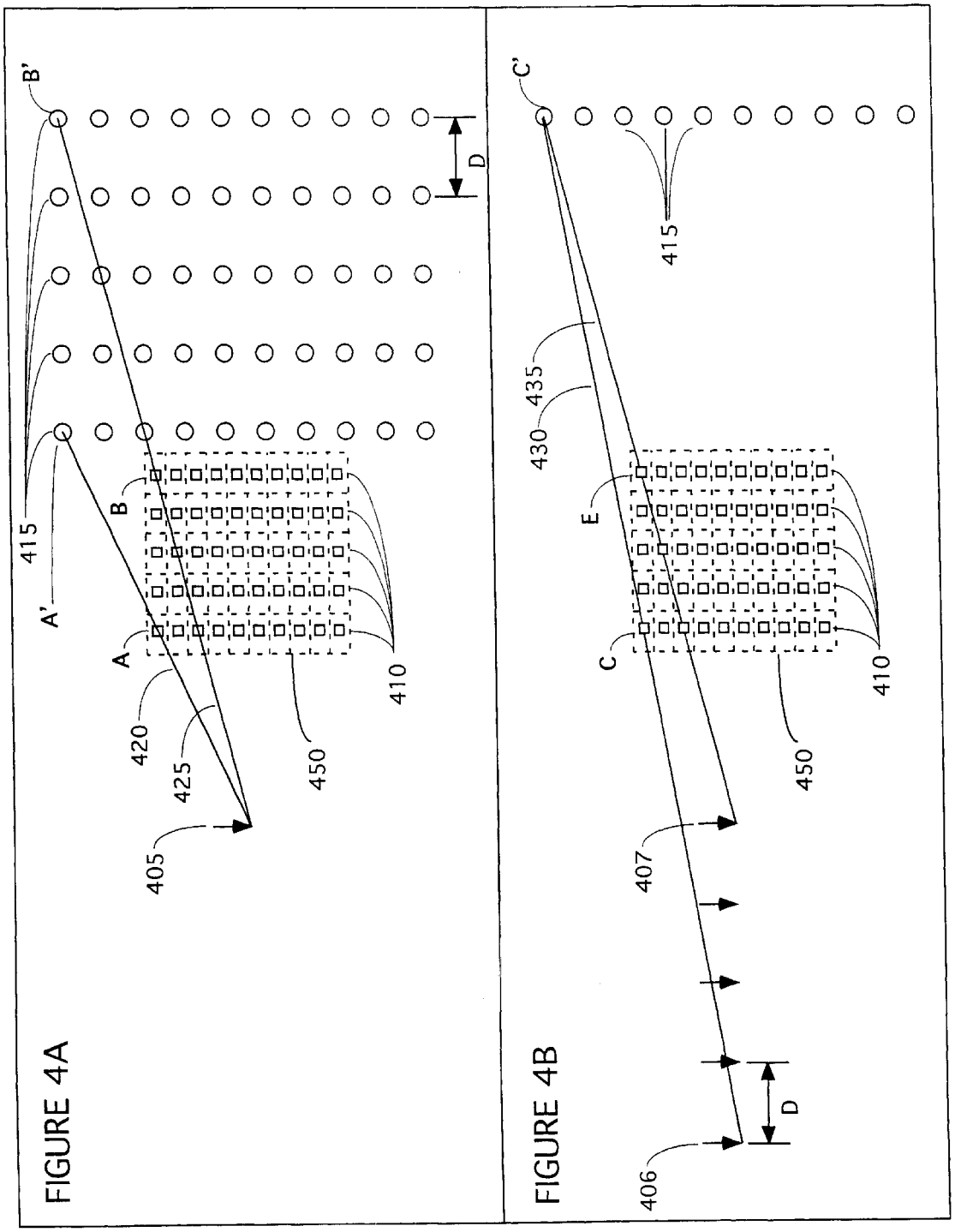
FIG. 4 contains a plan-view illustration of two preferred methods of forming a hybrid gather.

As is generally illustrated in FIG. 4, a hybrid gather suitable for use with the instant invention may be formed in a number of different ways. Of course, as is well known to those of ordinary skill in the art, hybrid gathers may be directly assembled from the traces in a full 3-D survey according to the methods discussed in U.S. Letters Pat. No. 6,026,058, cited previously. Additionally, the preferred methods of FIG. 4 may be utilized. FIG. 4A contains a plan view of the seismic coverage that results from firing a single seismic source 405 into a two-dimensional grid of receivers 415. As is well known to those skilled in the art, the seismic signal that is recorded at receivers 415 may be thought of as imaging the surface midway between the shot 405 and the receiver. For example, in FIG. 4A, when shot 405 is recorded at receiver A', the resulting trace will typically be assumed to have recorded the subsurface information beneath CMP A, the midpoint along the connecting line 420. Similarly, CMP B is imaged by shot 405 in combination with receiver B', CMP B being the midpoint of the connecting line 425. Thus, if the single shot 405 is simultaneously recorded by all 50 (in this example) receivers 415, the spatial distribution of the single-fold CMPs 410 that result will be as illustrated in this figure. The resulting collection of single fold CMP traces is one embodiment of a hybrid gather.

Alternatively, and as is illustrated in FIG. 4B, a hybrid gather may also be formed by taking multiple shots into a single line of receivers 415. In FIG. 4B, a series of shots (406 to 407) are collected along a line that is preferably orthogonal to receivers 415. In this arrangement, each shot creates one column of the single-fold CMP coverage 410. For example, when shot 406 is recorded by all of the receivers 415, the left most column of the coverage map (the column under CMP C) is obtained. CMP C is on the midpoint of the line 430 between shot 406 and receiver C'. Similarly, shot 407 gives rise to all of the CMPs in the column beneath CMP E. CMP E is located on midpoint of the line 435 between shot 407 and receiver C'. Thus, a preferred method of forming a hybrid gather is to combine traces from two or more shots that have been taken at different distances from a single recording line.

Note that, although in FIG. 4 the receiver line spacing was chosen to be equal to the shot spacing (the variable "D" in both FIGS. 4A and 4B), that was done purely for purposes of illustration and it should be clear that it is not a requirement of the instant invention that this spacing arrangement always be observed. However, if the goal is to replicate the hybrid gather of FIG. 4A by using a single line of receivers, only shots 406 to 407 at equally distant spacings D should be used.

Figure 5:
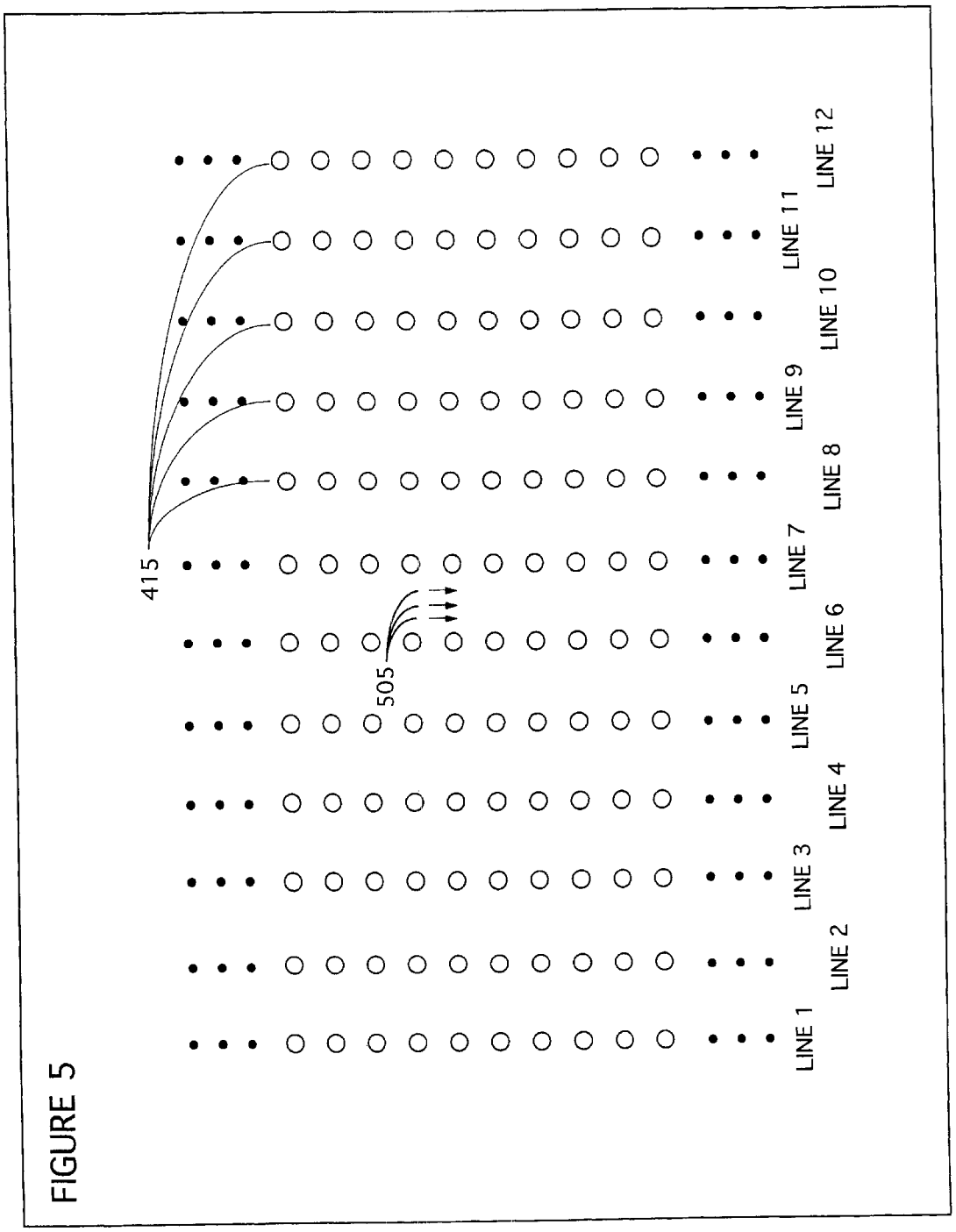
FIG. 5 contains a plan-view illustration of another method of forming a hybrid gather by recording multiple shots within a grid of seismic receivers.

Finally, the preferred method of assembling a hybrid gather is actually a combination of the methods of FIGS. 4A and 4B. As is illustrated in FIG. 5, in the preferred embodiment multiple shots 505 are taken within a grid work or "patch" of seismic receivers. Preferably, at least twelve seismic lines will be laid out in a parallel configuration, each line being separated form the next by a distance of about 1300' (or ¼ mile). A multiplicity of shots 505 are then taken between Lines 6 and 7, preferably at a shot spacing of about 220' (i.e., with six equally spaced shots falling between lines 6 and 7). All of the seismic receivers in this grid will preferably be recorded simultaneously, thereby producing a total of about 4900 traces from the experiment (12 lines by six shots by 72 receiver per line).

The traces from the various shots are then binned into CMPs according to well known formulae. In the gather of FIG. 5 there will be 4900 bins with one trace per bin. Obviously, depending on the bin size, there may be more than one trace in a bin. In such a case, it is preferable that those traces be summed together so as to produce a single trace in each bin, in effect producing a single fold volume that images the subsurface beneath the survey.

Preferred Embodiments

According to a preferred aspect of the instant invention, there is provided a method for rapid in-field determination of seismic acquisition parameters which utilizes a hybrid gather and multi-trace processing to obtain better quality data with which to make the determination.

Figure 3:
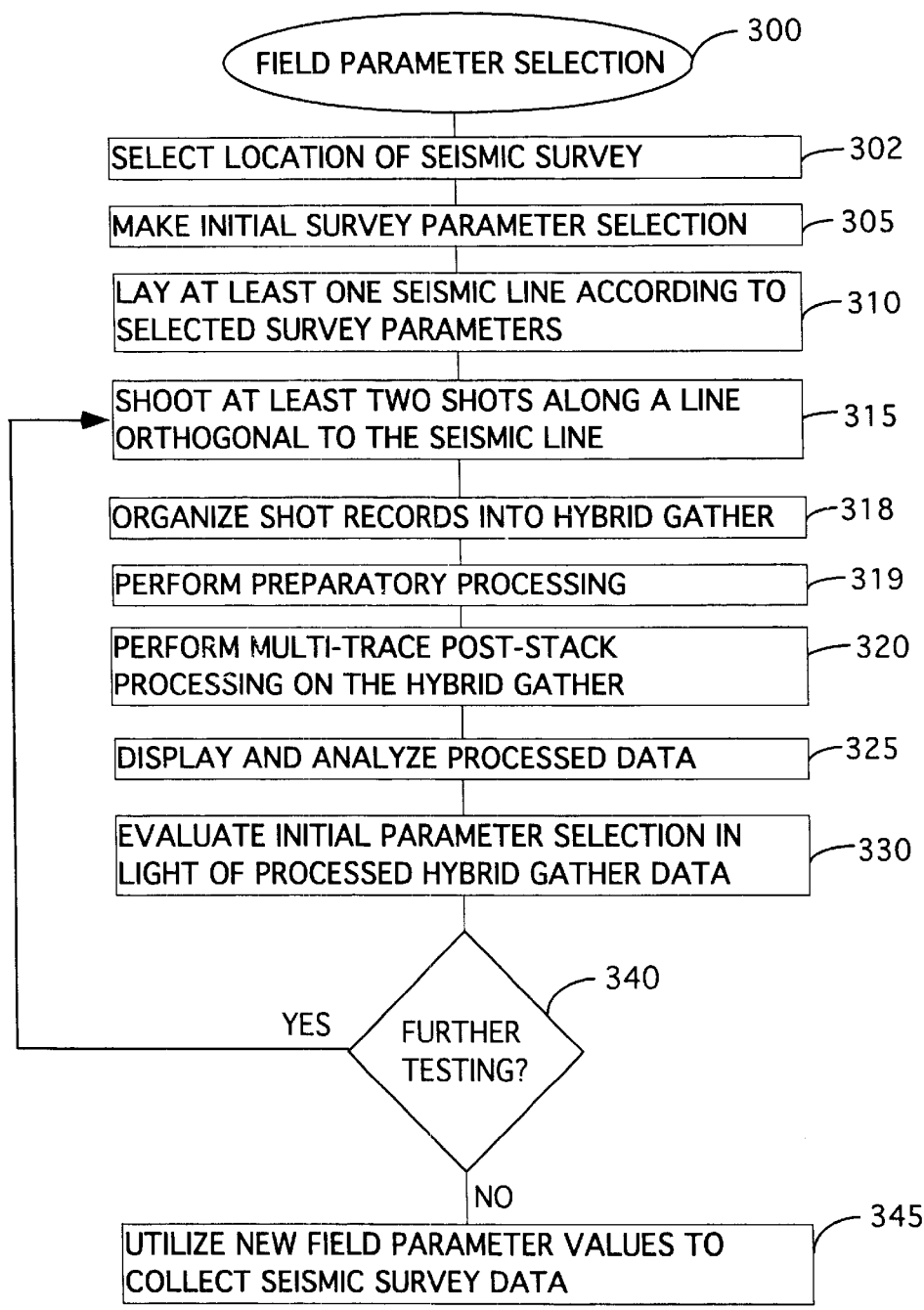
FIG. 3 is a flowchart that illustrates the principal steps in a preferred embodiment of the instant invention.

As a first preferred step, and as is generally illustrated in FIG. 3, the explorationist begins by selecting a particular location on the surface of the earth where the seismic survey is to be conducted 302. Presumably, this location will be above one or more targets of exploration interest that lie in the subsurface.

Next, the explorationist will typically begin to design the seismic survey to suit his or her particular needs (step 305). Although it would certainly be possible to delegate that task to the field crew, in practice that would be very unlikely to happen, as the process of survey design requires at least a general knowledge of the survey objectives (e.g., whether the survey is for purposes of exploitation or exploration) and the survey targets. That being said, someone will need to make some initial survey parameter decisions, and whether they are made in the explorationist's office or in the field is immaterial to the operation of the instant invention.

The selected location of the survey determines to a certain extent one of the first survey design decisions: the nature of the seismic source. That is, if the selected location is offshore, the explorationist would normally be expected to choose an air gun as a source. On the other hand, if the survey location is over land, the source might be dynamite, vibroseis, etc. All of this is well known to those skilled in the art.

Given the seismic source and the location, the explorationist might next construct a preliminary geologic structural model of the subsurface configuration that is generally expected to be found beneath the survey location. This model can then be used with any number of conventional seismic modeling programs to help make the initial parameter selections 305 according to methods well know to those of ordinary skill in this art. Through the use of seismic modeling it is possible to specify certain acquisition parameters and obtain at least rough estimates of the seismic data that will result. Of course, this step is not essential and seismic surveys may be conducted without any pre-survey modeling. However, given the cost of such surveys it is routine to do at least some preliminary parameter estimation before sending a crew out to collect data.

In the field, the acquisition team is charged with the task of obtaining the best quality data that is possible under the circumstances. In practice, the crew chief or supervising geophysicist will begin the survey by setting out one or more lines of seismic data for purposes of noise tests (step 310). Test shots are then taken into the line(s) and the information obtained therefrom is recorded on magnetic tape, disk, or other storage media (step 315).

The recorded test data are then reviewed for data quality, typically by plotting one or more "shot record" (or shot gather) traces on paper or on a computer screen, a shot record being the collection of traces that simultaneous record the same source activation. However, the level of noise in such data is often so high that even major reflectors cannot be seen. Additionally, it is difficult to see how adequately steeply dipping and truncated events are imaged as the data are unmigrated.

Hence, as a next preferred step 318, the shot records are organized into hybrid gathers.

If the data are collected according to the method of FIG. 4A, forming a hybrid gather amounts to binning the traces from a single shot record, thereby assigning a CMP location to each trace. On the other hand, when the test data are acquired according to the methods of FIG. 4B and 5, a somewhat more complex procedure must be followed. In this case, traces from a multiplicity of shots must be brought together and binned (step 318). Obviously, sufficient disk space and/or computer memory must be available to allow traces from multiple shots to be brought together for subsequent viewing and processing.

A unique property of the hybrid gather is that it is a single-fold spatial representation of the subsurface. Thus, any seismic processing step that would be appropriate for use with a stacked seismic volume, would be suitable for use with a hybrid gather (step 320). For example, 3D FXY deconvolution, 3D migration, 3D DMO, etc., could all be applied to a hybrid gather.

Note the importance of this result. Generally speaking in order to compute, for example, a post-stack 3D migration, a number of processing sequences would normally have to be applied including (at minimum) geometry application, sort into CMP gathers, NMO correction, and stack. However, with the hybrid gather approach a "stacked" single fold volume is obtained merely at the cost of "binning" the data into hybrid gathers, where "binning" is used as it typically is to refer to associating each unstacked seismic trace with a particular midpoint location on the surface of the earth. For 3D data, the location is typically a spatial region or "bin" so that every midpoint that falls within the same bin will be stacked together. In FIGS. 4A and 4B, the grid 450 is designed to indicate generally where bin boundaries might occur in that example. However, for purposes of the instant disclosure, the term "binning" should be used in its most general sense to refer to any association of unstacked data with a CMP or CDP location on the surface of the earth. As should be clear from the foregoing, binning a shot record can be straight forward as determining the shot and receiver locations and then calculating the midpoint of the line segment. Thus, binning is an operation that may be readily performed in the field where only limited computing power may be available.

After the data are binned, it might next be necessary to perform some preparatory processing (step 319) on the traces in the hybrid gather to make it ready for the multi-trace processing to follow. For example, it might be necessary to first correct the hybrid gather traces for move out (i.e., apply an NMO correction). Of course, the NMO velocity model could be as simple as a constant velocity model or a horizontally layered model, the NMO correction for either of which could easily be calculated and applied using only modest amounts of computer power. Still, if a full 3D velocity model is available, the NMO correction for each trace could still easily be calculated and applied, provided that the computational power were available.

As another example of preparatory processing 319, it might be necessary or desirable to apply field statics to correct the various receivers for elevational differences before moving to the next step. As a further example, it might be necessary to filter the data to remove coherent or incoherent noise.

As a next step 320, post-stack multi-trace processing is performed on the hybrid gather. Note that he term "multi-trace" processing will be used herein in its broadest sense to refer to any seismic process that uses two or more hybrid gather traces to form a single output trace. Multi-trace processes that would be suitable for use with the instant invention include, without limitation, 3D FXY deconvolution, 3D migration, 3D DMO, etc., as those terms are known in the art. Of course, the commonalty between each of these operations is that each involves some sort of "mixing" of a plurality of input traces to yield a single output trace. In accordance with the objects of the instant invention, this sort of processing would be expected to have the result of improving the data image quality, thereby making it easier to see how key reflectors are being imaged.

The processed data are next displayed and analyzed to determine whether or not the target reflectors are being adequately imaged (step 325). This could be done by simply plotting out portions of the now-processed data volume and examining the character of the reflectors present there. Because the hybrid gather traces are a 3D volume, one preferred way of examining the resulting traces is to extract individual "lines" from that volume and plot those out on paper records. Of course, it is preferred that conventional 3D display technology be used to display the resulting data volume, e.g., that the processed data volume be displayed on a high resolution computer monitor. This would permit operations such as horizontal and vertical "slicing" of the data to be performed, thereby providing the geophysicist with powerful tools with which to analyze the collected data.

As a next step, the quality of data will be evaluated (step 330). This evaluation could include a simple examination to see if the coherent and incoherent noise have been attenuated sufficiently so that the expected pattern of reflectors can be seen. It could further include a determination of whether the target reflectors are present on the seismic section and whether they are adequately imaged. In short, any sort of quality evaluation that is typically performed on field seismic data might be applied here.

To the extent that the data quality are not as good as was expected, any of the parameters discussed previously might be modified before collecting any additional data. Obviously, if necessary steps 315 through 330 can be repeated using new parameter values, time and money permitting.

As a final step, the chosen parameters will be utilized in collecting the seismic survey (step 345). Of course, if the data quality changes during the survey, the previous method may be repeated at any time.

Conclusions

It should be noted and remembered that although the instant method is designed to allow small quantities of seismic traces to be efficiently processed via multi-trace processes—and that feature is of particular use in the field during seismic surveys—in fact the instant invention might be applied anywhere including at a processing center on minicomputers, super computers, massively parallel computers, etc.

Finally, in the previous discussion, the language has been expressed in terms of operations performed on conventional seismic data. But, it is understood by those skilled in the art that the invention herein described could be applied advantageously in other subject matter areas, and used to locate other subsurface minerals besides hydrocarbons, e.g., coal. By way of additional examples, the same approach described herein could be used to process and/or analyze multi-component seismic data, shear wave data, magnetotelluric data, cross well survey data, full waveform sonic logs, or model-based digital simulations of any of the foregoing. Additionally, the methods claimed herein after can be applied to mathematically transformed versions of these same data traces including, for example: frequency domain Fourier transformed data; transformations by discrete orthonormal transforms; instantaneous phase, instantaneous frequency, analytic traces, and quadrature traces; etc. In short, the process disclosed herein can potentially be applied to any collection of geophysical time series, and mathematical transformations of same, but it is preferably applied to a collection of spatially related time series containing structural and stratigraphic features. Thus, in the text that follows those skilled in the art will understand that "seismic trace" is used herein in a generic sense to apply to geophysical time series in general.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

REFERENCES

The documents and texts that are listed below are specifically incorporated by reference into this patent application in their entireties:

Aki, K. and P. Richards, 1980, *Quantitative Seismology*, Freeman Press, N. Y.

Coffeen, J. A., *Seismic Exploration Fundamentals*, 1978, Penwell Press, Tulsa, Okla.

Telford, W. M., Geldart, L. P., Sheriff, R. E., and Keys, D. A., 1978, *Applied Geophysics*, Cambridge University Press, N.Y.

Yilmaz, Ozdogan, 1987. *Seismic Data Processing*, Society of Exploration Geophysicists.

That which is claimed is:

1. A method of determining seismic acquisition parameters for use in a seismic survey over a predetermined portion of the subsurface of the earth, said predetermined portion of the subsurface of the earth containing structural and stratigraphic features associated with the generation, migration, accumulation, or presence of hydrocarbons, said seismic survey being characterized by at least one acquisition parameter, comprising the steps of:
   (a) selecting an initial value for at least one of said at least one acquisition parameters;
   (b) collecting a plurality of seismic traces according to any initial value of said at least one acquisition parameters so selected;
   (c) forming at least one hybrid gather from any seismic traces so collected;
   (d) applying a multi-trace seismic processing algorithm to at least one of said at least one hybrid gathers, thereby creating a processed seismic volume;
   (e) determining from said processed seismic volume and from any selected initial values for said at least one acquisition parameters at least one final acquisition parameter; and,
   (f) collecting at least a portion of said seismic survey using said final acquisition parameter, said collected portion of said seismic survey for use in the identification of said structural and stratigraphic features associated with the generation, migration, accumulation, or presence of hydrocarbons.

2. A method of determining seismic acquisition parameters according to claim 1, wherein step (e) includes the steps of:
   (e1) determining from said processed seismic volume and from any selected initial values for said at least one acquisition parameters, a new value for at least one of said selected initial values, and,
   (e2) selecting as a final survey parameter said new value for at least one of said selected initial values.

3. A method of determining seismic acquisition parameters according to claim 1, wherein step (b) includes the steps of:
   (b1) placing a plurality of seismic receivers in a substantially linear arrangement,
   (b2) activating a plurality of seismic sources, each of said seismic sources being at least approximately located along a line that is substantially orthogonal to said linear arrangement of seismic receivers,
   (c3) recording seismic signals from said plurality seismic sources at each of said plurality of seismic receivers, thereby obtaining a plurality of seismic traces, wherein at least one of said arrangement of said seismic receivers, said plurality of seismic sources, and said recording of seismic signals is configured according to said at least one acquisition parameters so selected.

4. A method of determining seismic acquisition parameters according to claim 1, wherein step (d) includes the steps of applying a post-stack 3D migration algorithm to at least one of said at least one hybrid gathers, thereby creating a processed seismic volume.

5. A method of determining seismic acquisition parameters according to claim 1, wherein step (d) includes the steps of applying a 3D FX deconvolution seismic processing algorithm to at least one of said at least one hybrid gathers, thereby creating a processed seismic volume.

6. A method of determining seismic acquisition parameters according to claim 1, wherein step (d) includes the steps of applying a 3D DMO seismic processing algorithm to at least one of said at least one hybrid gathers, thereby creating a processed seismic volume.

7. A method of determining seismic acquisition parameters according to claim 1, wherein step (a) includes the steps of selecting a seismic receiver spacing.

8. A method of determining seismic acquisition parameters according to claim 1, wherein step (a) includes the steps of selecting a seismic source spacing.

9. A method of determining seismic acquisition parameters according to claim 1, wherein step (a) includes the steps of selecting an instrument filter.

10. A method of determining seismic acquisition parameters according to claim 1, wherein step (e) includes the steps of
    (e1) displaying at least a portion of said processed seismic volume, and
    (e2) determining from said displayed portion of said processed seismic volume and said selected initial values for said at least one acquisition parameters at least one final acquisition parameter.

11. A device adapted for use by a digital computer wherein a plurality of computer instructions defining the method of claim 1, are encoded, said device being readable by said digital computer, and, said computer instructions programming said computer to perform said method.

12. A device according to claim 11, wherein said device is selected from the group consisting of computer RAM, computer ROM, flash RAM, a PROM chip, a RAM card, a magnetic tape, a magnetic disk, a magneto-optical disk, an optical disk, a DVD disk, or a CD-ROM.

13. A method of quality control for use in collecting seismic data, comprising the steps of:
    (a) selecting an initial value for at least one acquisition parameter;
    (b) collecting a plurality of seismic traces according to at least said selected initial value of said at least one acquisition parameter;

(c) forming at least one hybrid gather from any seismic traces so collected;

(d) applying a multi-trace seismic processing algorithm to at least one of said at least one hybrid gathers, thereby creating a processed seismic volume;

(e) determining from said processed seismic volume and said selected initial value of said at least one acquisition parameter at least one final acquisition parameter; and, (f) conducting at least a portion of a seismic survey using said at least one final acquisition parameter.

14. A method according to claim 13, wherein said multi-trace seismic processing algorithm includes processing algorithms selected from the group consisting of 3D FXY deconvolution, post-stack 3D migration, and 3D DMO.

15. A device adapted for use by a digital computer wherein a plurality of computer instructions defining the method of claim 13, are encoded, said device being readable by said digital computer, and, said computer instructions programming said computer to perform said method.

16. A device according to claim 15, wherein said device is selected from the group consisting of computer RAM, computer ROM, flash RAM, a PROM chip, a RAM card, a magnetic tape, a magnetic disk, a magneto-optical disk, an optical disk, a DVD disk, or a CD-ROM.

17. A method of determining seismic acquisition parameters according to claim 13, wherein step (a) includes the steps of selecting a seismic receiver spacing.

18. A method of determining seismic acquisition parameters according to claim 13, wherein step (a) includes the steps of selecting a seismic source spacing.

19. A method of determining seismic acquisition parameters according to claim 13, wherein step (a) includes the steps of selecting an instrument filter.

20. A method of determining seismic acquisition parameters according to claim 13, wherein step (e) includes the steps of (e1) displaying at least a portion of said processed seismic volume, and (e2) determining from said displayed portion of said processed seismic volume and said selected initial values for said at least one acquisition parameters at least one final acquisition parameter.

* * * * *